No. 865,698. PATENTED SEPT. 10, 1907.
J. J. HENDLER.
RUBBER VEHICLE TIRE.
APPLICATION FILED SEPT. 20, 1905.

Witnesses:

Inventor:
John J. Hendler,
By Albert N. Graves,
Atty.

UNITED STATES PATENT OFFICE.

JOHN J. HENDLER, OF CHICAGO, ILLINOIS, ASSIGNOR TO TIGER TIRE COMPANY, A CORPORATION OF NEW YORK.

RUBBER VEHICLE-TIRE.

No. 865,698.     Specification of Letters Patent.     Patented Sept. 10, 1907.

Application filed September 20, 1905. Serial No. 279,220.

To all whom it may concern:

Be it known that I, JOHN J. HENDLER, a citizen of the United States, residing at Chicago, in the county of Cook and State of Illinois, have invented certain new and useful Improvements in Rubber Vehicle-Tires, of which the following is a specification.

This invention relates to improvements in rubber vehicle tires, and refers more specifically to an improved tire provided with a filling of peculiar character adapted to combine the advantages of a pneumatic tire and a solid or filled tire which cannot collapse.

Among the salient objects of the invention are to provide a tire which may be inflated with air or other gas but which nevertheless is provided with an additional filling possessing the characteristics of resiliency and lightness and the capacity of being distended independently of the pneumatic inflation; to provide a construction in which the operation of the tire is substantially that of an ordinary pneumatic tire when inflated but which when punctured will not collapse and therefore avoids injury to the tire and rim; to provide a construction which while possessing the characteristics and advantages stated, may be readily applied to or detached from the wheel rim and inflated in the usual manner; to provide a construction in which the distention of the tire independently of its inflation, i. e. after it has been punctured, may be accomplished by simply injecting water or analogous liquid, and in general to provide an improved article of the character referred to.

To the above ends the invention consists in the matters hereinafter described and more particularly pointed out in the appended claims.

The invention will be readily understood from the following description, reference being had to the accompanying drawing, in which—

Figure 1:
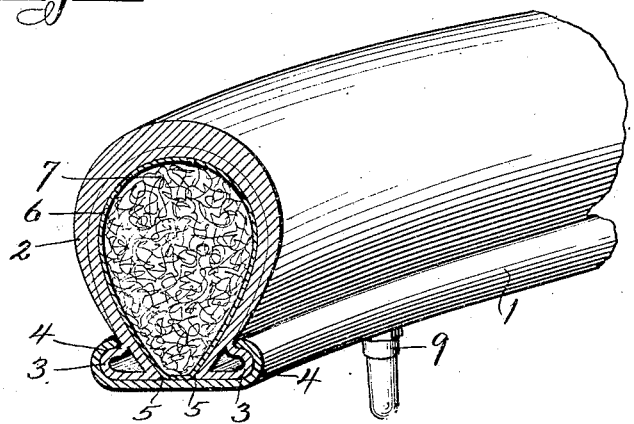
Figure 2:
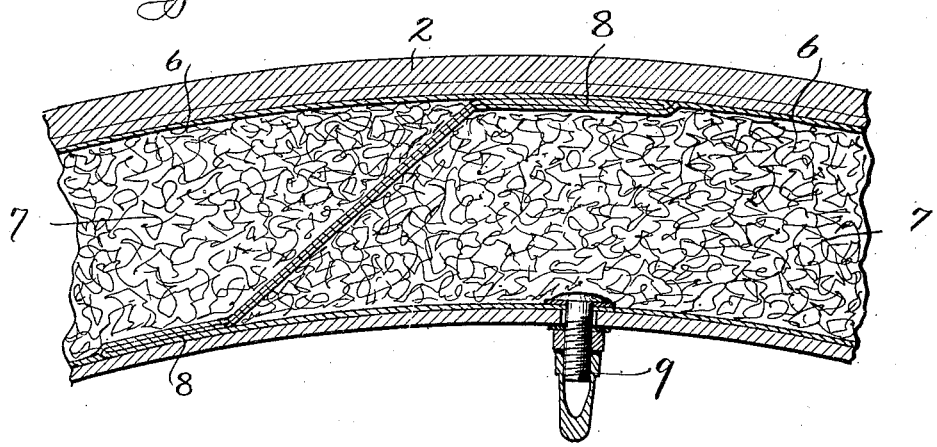

Figure 1 is a perspective view of a fragmentary portion of a tire embodying my invention, one end of said portion being shown in transverse section; Fig. 2 is a longitudinal section taken in the central plane of the wheel of a fragmentary portion of the tire.

The problem of devising a rubber tire which will possess the resiliency of a pneumatic filling but nevertheless will be capable of at least a limited use after the tire has been punctured and thus prevent injury to the tire or rim during its travel to a point where it can be repaired, is, of course, a very old one.

I am aware that many expedients have been tried, such as making the tire of internally cellular structure, providing a multiplicity of separately inflated tubes within a single larger outer tube, or providing a tubular tire having a fibrous filling and which would give to the tire the characteristics of a cushion tire after puncturing. So far as I am aware, however, it has not heretofore been proposed to provide a tire which after being punctured is capable of being distended and maintained in distended form independently of the pneumatic inflation.

Describing a preferred and practical embodiment of the invention, 1 designates the rim of a vehicle wheel, which in the present instance is of channel form and adapted to receive a tire of the clencher type.

2 designates as a whole an outer sheath composed of rubber and fabric and provided along its lateral edges with ribs 3 suitably shaped to fit within the lateral grooves 4 of the channeled rim. The sheath and rim are so constructed as to provide sufficient space between the proximate edges 5—5 of the sheath to permit the latter to be forced inwardly sufficiently to disengage one of the ribs 3 when the tire is deflated or partially deflated.

Within the outer sheath is arranged an inner tube 6 of rubber which is of suitable size to fit the interior of the sheath when the latter is in position in the rim and is of a length to extend around the circumference of the wheel and overlap somewhat at its meeting ends, as shown clearly in Fig. 2. The inner tube is provided with a filling of cellulose of such character that when dry it is extremely light and resilient and when moistened absorbs the water and expands with force. I have found the pith of cornstalks in granulated form to be highly suitable for this purpose. This pith is highly porous, extremely light and resilient, and possesses in a marked degree the capacity of swelling or expanding when moistened. The inner tube is filled with the granulated pith, as indicated at 7, and a sufficient quantity placed in the tube so that when the latter is put into place inside of the sheath, and the latter forced into position in the rim, the pith will be packed and compressed to a considerable extent, not, however, to such extent as to make it impossible to adjust the sheath into, or remove it from, the rim. The opposite sides of the end portions of the inner tube are brought together and cemented to each other, as indicated at 8, Fig. 2; the ends of the filled portions being preferably shaped to overlap each other obliquely, as also seen clearly in Fig. 2. In this manner the inner tube is sealed in substantially the same manner as is common with pneumatic tires of the clencher type unprovided with fillings. The inner tube is also provided with one or more inflating nipples 9, preferably several, attached to the inner side thereof and extending out through the rim in a manner well understood by those familiar with this art.

In operation, the tire after being adjusted to position on the wheel is inflated with air through the nipple 9 until it acquires the desired degree of resiliency; the granulated and cellular condition of the filling permitting the tire to be inflated in all parts with the same facility as though the filling were not present. The resiliency of the filling is such that it but very slightly modifies the resiliency of the tire as a whole as compared with pneumatic tires of similar construction devoid of such a filling. The use of the tire is therefore substantially identical with that of ordinary pneumatic tires until such time as a puncture or rupture occurs. In such event, in case the puncture be not of so great extent as to render it impossible to keep the filling within the tire, the chauffeur may at his option run the tire in deflated form on the cellulose filling until such time as it can be properly repaired and reinflated, or he may readily inflate the tire by injecting steam or water into the cellulose filling through the puncture and through the nipples. In order to facilitate the injection of the liquid or steam, the inner tube is preferably provided with the plurality of nipples hereinbefore mentioned.

The injection of water or steam causes the cellulose to expand and hold the tire distended effectively, so that, barring a slight loss of resilience, the tire is in condition to run quite satisfactorily and without any danger whatever of injuring it by the cutting action of the rim, as does occur in running a deflated tire. It is, of course, obvious that the cellulose filling will be ample to prevent injury of the tire by cutting on the rim even though the water be not injected to cause the cellulose to expand, and the cellulose is sufficiently resilient to afford a comfortably riding vehicle, independent of the pneumatic inflation. It is to be noted in this connection that the presence of the cellular filling in the tire prevents the free circulation of air when the wheel is running under pressure, and for this reason a somewhat lower degree of inflation pressure may be employed without lessening the buoyancy or permitting the tire to flatten in running. This is a feature of much importance because it is not uncommon for tires to burst by simply standing in the sun and thus becoming heated, which, of course, indicates that the degree of pressure under which tires are ordinarily run approaches more closely than is desirable to a bursting pressure. It will be obvious that as each successive portion of the tire is brought under pressure the air in that locality will be compelled to filter through and gradually distribute itself through the cellular filling, rather than rushing freely away from the point of pressure. Obviously the rushing of the air around the interior of the tire rapidly when the vehicle is running at a high speed generates heat, and this in turn increases the tension of the air and danger of bursting. The presence of the cellular filling prevents the generation of that portion of the heat due to flowing friction and is for this reason beneficial.

I claim as my invention:

1. The combination with a vehicle wheel provided with a channeled rim, of a tire comprising an outer sheath of the clencher type adapted to said rim, a sealed inner tube provided with one or more inflating inlets and a filling of cellular cellulose compacted within said inner tube, substantially as described.

2. A clencher tire, comprising an outer sheath, a sealed inner tube provided with an inflating inlet, the ends of said inner tube being overlapped and cemented together, and a filling of pith compacted within said inner tube; substantially as described.

3. A clencher tire, comprising an outer sheath adapted for a clencher wheel rim, a sealed inner tube provided with an inflating connection, the overlapping ends of the inner tube being cemented together, and a filling composed of granulated pith of corn-stalks compacted within said inner tube; substantially as described.

JOHN J. HENDLER.

Witnesses:
ALBERT H. GRAVES,
K. A. COSTELLO.